United States Patent [19]

Acampora et al.

[11] Patent Number: 4,684,983
[45] Date of Patent: Aug. 4, 1987

[54] NON-LINEAR PROCESSOR FOR REDUCING THE DYNAMIC RANGE OF A DIGITIZED ERROR SIGNAL

[75] Inventors: Alfonse Acampora, Staten Island, N.Y.; Chung H. Lu, Plainsboro, N.J.

[73] Assignee: RCA Corporation, Princeton, N.J.

[21] Appl. No.: 890,958

[22] Filed: Jul. 31, 1986

[51] Int. Cl.⁴ .............................................. H04N 7/12
[52] U.S. Cl. .................... 358/135; 358/136; 358/138; 375/27
[58] Field of Search ............. 358/133, 135, 136, 138; 375/27

[56] References Cited

U.S. PATENT DOCUMENTS

| 4,077,053 | 2/1978 | Ishiguro | 358/136 |
| 4,099,122 | 7/1978 | Van Buul | 358/135 |
| 4,179,710 | 12/1979 | Ishiguro et al. | 358/135 |
| 4,200,886 | 4/1980 | Musmann et al. | 358/135 |
| 4,368,487 | 1/1983 | Sabri | 358/166 |
| 4,388,729 | 6/1983 | Spencer et al. | 455/72 |
| 4,541,102 | 9/1985 | Grallert | 375/30 |
| 4,574,383 | 3/1986 | Irie et al. | 375/27 |
| 4,609,941 | 9/1986 | Carr et al. | 358/136 |

Primary Examiner—Howard W. Britton
Assistant Examiner—John K. Peng
Attorney, Agent, or Firm—Joseph S. Tripoli; Henry I. Steckler

[57] ABSTRACT

In systems in which the current digitized level value of a synthesized-signal sample (e.g., a television video signal sample) is determined by summing a transmitted error-signal-sample level value and a delayed previous synthesized-signal-sample level value, the dynamic range of the transmitted error-signal samples are reduced by as much as one-half. This is accomplished by passing the error-signal samples through a first non-linear processor (NLP) before transmission thereof and then passing the summed output through a second NLP. Both NLPs exhibit the same specified transfer function taught by the present invention.

20 Claims, 9 Drawing Figures

NON-LINEAR PROCESSOR FOR REDUCING THE DYNAMIC RANGE OF A DIGITIZED ERROR SIGNAL

BACKGROUND OF THE INVENTION

1. Field of the Invention

This invention relates to a digital processing system for deriving a digitized error signal from a temporal stream of successive digitized input samples of an input signal, and then deriving a digitized synthesized signal corresponding to such input signal from the error signal. The input signal may represent a time-varying one-dimensional parameter, such as an audio signal by way of example. In such a case, all of the successive input samples define a parameter. Alternatively, the input signal may represent a collection of a plurality of separate time-multiplexed specified parameters, such as a television video signal, by way of example. In this latter case, each different spatially-located (i.e., having different horizontal and/or vertical spatial coordinates) pixel within an image frame may, by way of example, represent a separate parameter, so that successive level values of any individual one of the separate pixel parameters during each of successive image frames is defined by its own predetermined subset of digitized input samples of the input signal.

In any case, such a digital processing system includes a first loop which includes delay means for deriving the error signal from the input signal, and a second loop which includes delay means for deriving the synthesized signal from the error signal. Two respective examples of such a first loop is a digital pre-emphasis, finite impulse response (FIR) filter for a noise-reduced signal transmission system, and a digital differential pulse code modulator (DPCM) for a compressed-data signal transmission system. Two respective examples of the second loop are a de-emphasis infinite impulse response (IIR) filter for a noise-reduced signal transmission system, and an inverse DPCM for a compressed-data signal transmission system.

2. Description of the Prior Art

Digital processing systems, of the type described above, are known in the art. They employ an input signal comprised of a temporal stream of successive digitized input samples occurring at a given sample frequency. The level value defined by each of the input samples is represented by a multibit code comprised of N bits, where N is a given plural number capable of defining a maximum numerical value M. In the case of digitized television video zignal samples, by way of example, it is conventional to employ a multibit code comprised of eight bits, capable of defining all numerical (i.e., integral) values in a range extending from a minimum value of zero to a maximum value of 255. However, in the case of a television video signal, each derived error-signal sample (which defines a level value that is the difference between the respective level values of the current sample of the current image frame and a first given function of the corresponding sample of at least one previous image frame) is capable of having a level value in a range that extends from $-255$ to $+255$. Therefore, the dynamic range of a digitized error-signal sample is twice that of a digitized input-signal sample (thereby requiring one extra bit to represent both the polarity and absolute value of its algebraic level value).

Often, a digitized error signal comprised of (N+1)-bit samples, is derived at a transmitter and forwarded over a transmission channel to a receiver. At the receiver, a synthesized signal, comprised of N-bit samples, is derived from the received error-signal samples. The transmission in real time of (N+1)-bit samples at a given sample rate over a transmission channel requires a greater transmission-channel bandwidth than does the transmission of N-bit samples at the same given sample rate. Transmission-channel bandwidth is costly. Since both the input an synthesized signals are comprised of N-bit samples, the requirement that the transmission-channel bandwidth be wide enough to transmit (N+1)-bit samples is wasteful. In addition, the processing of (N+1)-bit samples requires more hardware than does the processing of N-bit samples. In the case of digitally-processed television video signals, which represent scanned images having both vertical and horizontal dimensions, the additional hardware required to process (N+1)-bit samples, rather than N-bit samples, can become quite significant.

The present invention overcomes the problem of the prior art by providing a technique for reducing the number of bits representing each error-signal sample from (N+1)-bits to N-bits, without the introduction of any irreversible loss in signal information.

SUMMARY OF THE INVENTION

The present invention is incorporated in a digital processing system for use in processing an input signal comprised of a temporal stream of successive digitized input samples occurring at a given sample frequency. The level value defined by each of the input samples is represented by a multibit code comprised of N bits, where N is a given plural number capable of defining a maximum numerical value M. At least a predetermined subset of the input samples defines successive level values of a specified parameter that occur at each of successive time intervals equal to a first integral number of periods of the given sample frequency.

The digital processing system, which incorporates the present invention, is comprised of first and second loops each of which includes delay means for delaying samples that are applied to the delay means by a second integral number of the time intervals. The first loop further includes first processing means coupled to the delay means thereof and including subtraction means for deriving from the input signal an output signal comprised of samples each of which defines a level value that is the difference between the respective level values of the current sample of the specified parameter and a first given function of at least one previous sample of the specified parameter. The second loop further includes second processing means coupled to the delay means thereof and to the first loop and including summation means for deriving from the output signal of the first loop a synthesized signal comprised of samples each of which defines a level value that is the sum of the respective level values of the current sample of the output signal and a second given function of at least one previous sample of the output signal. The second given function is the inverse function of the first given function.

As in the prior art, the subtraction means derives an error signal comprised of samples each of which defines a level value equal to the difference in the N-bit level values of the N-bit current sample of the specified parameter and the corresponding N-bit delayed sample of the specified parameter. The result is that a multibit code of (N+1)-bits, one bit of which represents polarity and N bits of which represent absolute value, is required to represent the algebraic level value X of each of the error-signal samples. Also, the summation means derives a sum signal comprised of samples each of which defines a level value equal to the sum of the level value of the current sample of the output signal of the first loop and the corresponding delayed sample of the output signal of the first loop.

In accordance with an improvement provided by the present invention, each of the first and second processing means of the first and second loops further comprises non-linear process or (NLP) means exhibiting a given non-linear characteristic for modifying the level value X of sample-inputs thereto. The given non-linear characteristic is such that for sample-inputs thereto having (1) negative values of X that are more negative than minus M/2, the output is equal to (M+X), (2) negative values of X that are less negative minus M/2, the output is equal to X, (3) positive values of X that are less positive than plus M/2, the output is equal to X, and (4) positive values of X that are more positive than plus M/2 the output is equal to (−M+X). The error-signal samples are applied as the sample-inputs to the NLP of the first processing means, and the sum-signal samples are applied as the sample-inputs to the NLP of the second processing means.

Furthermore, the first processing means of the first loop is comprised of derivation means that includes the delay means of the first loop for deriving the corresponding delayed samples of the specified parameter, after a delay equal to the second integral number of time intervals, from solely one of (a) the input samples of the input signal and (b) the modified error-signal samples. Similarly, the second processing means of the second loop is comprised of derivation means, that includes the delay means of the second loop for deriving the corresponding delayed samples of the first-loop output signal, after a delay equal to the second integral number of time intervals, from the modified sum-signal samples.

BRIEF DESCRIPTION OF THE DRAWING

FIG. 6 illustrates the transfer function of the non-linear processors (NLP) employed in each of FIGS. 4, 5 and 5a; and FIG. 7 graphically illustrates input-output relationships helpful in describing the operation of the embodiment of the invention shown in FIG. 5a.

DESCRIPTION OF THE PREFERRED EMBODIMENTS

Figure 1:
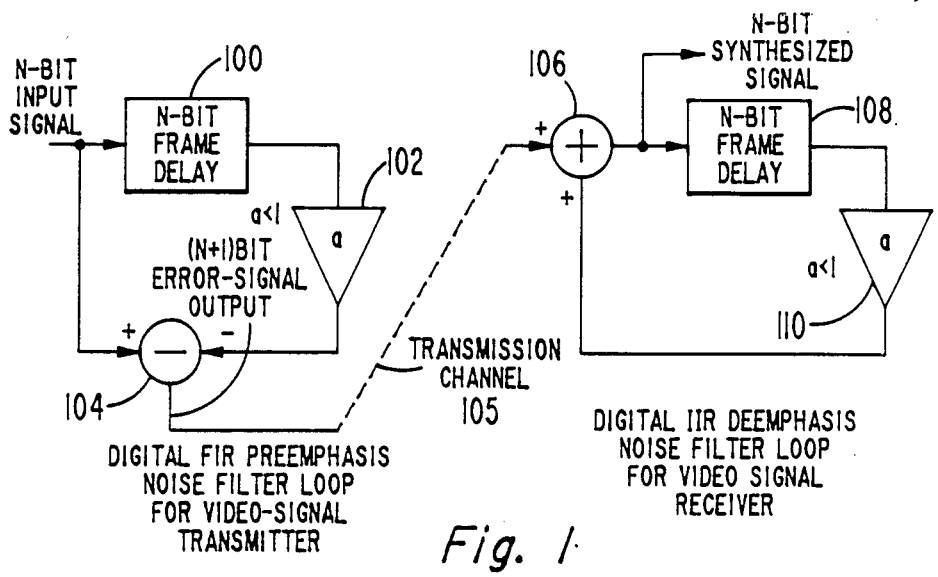
FIG. 1 illustrates prior-art digital pre-emphasis and de-emphasis noise-reduction filter for use in a video-signal transmission system.
Figure 2:
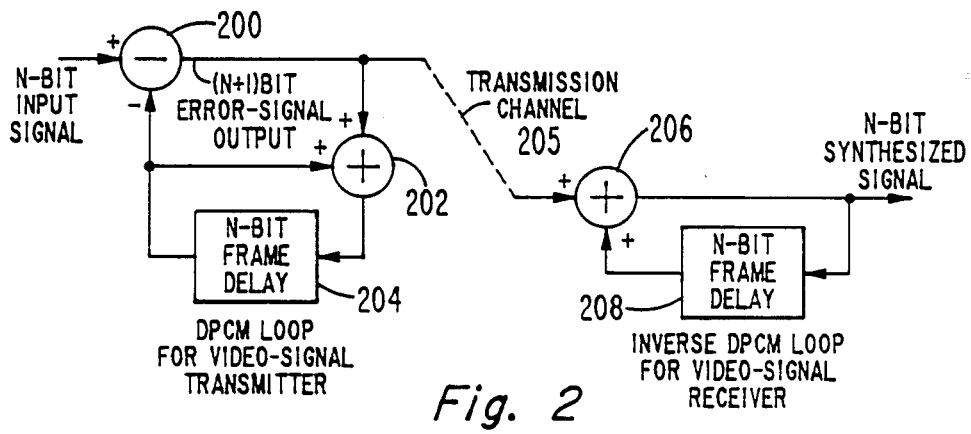
FIGS. 2 and 2a, respectively, illustrate prior-art linear and quantized digital DPCM video-signal transmission systems.
Figure 2A:
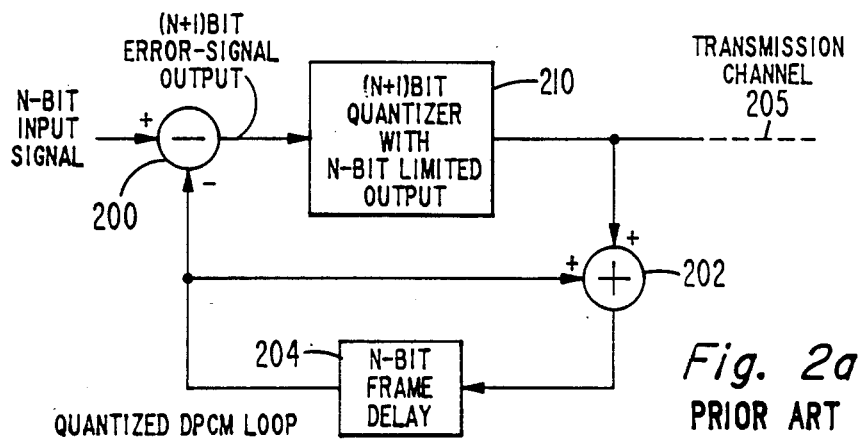

While not limited thereto, the present invention is particularly suitable for use in the type of prior-art video-signal transmission systems shown in FIGS. 1, 2 and 2a. In these types of transmission systems, the dynamic range of the level values of the transmitted video signal tends to be excessive. In the past, the choice was to either provide a transmission channel having a bandwidth that was large enough to transmit the excessive dynamic-range video signal in real time, or to reduce the required bandwidth of the transmission channel by limiting the level values of the transmitted video signal to a smaller dynamic range. In the latter case, the price to be paid was a degradation in the image quality of the image information synthesized at the receiver from the transmitted video signal.

FIG. 1 shows an example of a digital finite impulse response (FIR) pre-emphasis noise filter loop for a video signal transmitter and a digital infinite impulse response (IIR) de-emphasis noise filter loop for a video-signal receiver that are suitable for use in proposed direct broadcast satellite (DBS) television systems. Such systems transmit video signals in a format comprised of analog multiplexed chrominance and luminance components, in which at least the chrominance component of the transmitted video information is time-compressed. The use of a pre-emphasis noise filter at the transmitter and a de-emphasis noise filter at the receiver tends to improve the normally relatively low signal-to-noise ratio of the received video signal.

As known in the art, an FIR or IIR filter is a multitap filter, which, in its simplest and least costly form, is comprised of a single delay means having a first tap at the input thereof and a second tap at the output thereof. More complex FIR or IIR filters include a plurality of serially-connected delay means and have respective taps at the input to the first delay means in the series, at the output of the last delay means in the series, and at the junction of each adjacent pair of delay means in the series. Each delay means employed in the video-signal FIR or IIR filters of the present invention has to delay each of the large number of pixels in an image frame by one entire frame period. This makes each frame-delay means relatively expensive. For this reason, FIG. 1 employs an FIR pre-emphasis noise-reduction filter at the transmitter which is comprised of only a single frame-delay means. Similarly, the corresponding IIR de-emphasis noise-reduction filter at the receiver is also comprised of only a single frame-delay means. However, the present invention contemplates the use of more complex noise-reduction filters, as well.

In FIG. 1, the pre-emphasis noise-reduction filter at the transmitter is comprised of a first loop that includes N-bit frame-delay means 100, a multiplier 102 and subtraction means 104. An N-bit video input signal, comprised of a temporal stream of successive digitized input pixel samples occurring at a given sample frequency, is applied as an input to frame-delay means 100 and as a plus (+) input to subtraction means 104. Frame-delay means 100, which delays each of the stream of input pixel samples by one frame period, derives an output comprised of the pixel samples of the previous frame. After having their respective level values multiplied by a fractional value a smaller than unity in multiplier 102, the previous-frame pixel samples are applied as delayed samples to the minus (−) input of subtraction means 104, thereby deriving an error-signal output from subtraction means 104. The N-bit (e.g., 8-bit) video input signal is capable of representing pixel level values in a range extending from a numerical value of zero, which defines the "blackest" pixel, to a maximum numerical value M (e.g., 255), which defines the "whitest" pixel. The dynamic range of the pixel input-level values of the N-bit input signals is not increased, but decreased somewhat, by passing through frame delay means 100 and multiplier 102. Therefore, the delayed sample signal applied to the minus input of subtraction means 104 also can be expressed as an N-bit signal.

The difference in level values between corresponding pixels of the N-bit input signal and the N-bit delayed-sample signal may require (N+1) bits to represent its dynamic range. Specifically, in the case of moving images, it is possible that a pixel of the current image frame is a "whitest" pixel and the corresponding pixel of the previous frame is a "blackest" pixel, or vice versa. In the first case, the algebraic level value of the pixel is defined by the maximum positive numerical value M, while in the second case it is defined by the maximum negative numerical value $-M$. Thus, it takes (N+1)-bits (one of which represents polarity and the remaining eight of which represent absolute value) to represent the dynamic range of the algebraic difference in level values of the error-signal output from subtraction means 104. The error-signal is transmitted over a transmission channel from the transmitter to the IIR de-emphasis noise-reduction filter at the receiver. This de-emphasis noise filter is comprised of a second loop that performs an inverse operation on the received error signal from that performed on the original input signal by the first loop at the transmitter to derive the error signal. This results in the derivation of an N-bit synthesized signal at the receiver which corresponds to the original input signal.

Specifically, the second loop, which comprises the IIR de-emphasis noise-reduction filter at the receiver, is comprised of summation means 106, N-bit frame-delay means 108 (which is similar in function to frame-delay means 100) and a multiplier 110 (which is similar in function to a multiplier 102).

It is apparent that transmission channel 105 must have sufficient information carrying capacity to transmit, in real time, a temporal stream of (N+1)-bit error-signal pixel samples, despite the fact that the original input signal at the transmitter and the corresponding synthesized signal at the receiver are each comprised of a temporal stream of only N-bit pixel samples. This is wasteful use of transmission channel capacity and is relatively expensive.

Data-compression transmission systems incorporating differential pulse code modulation (DPCM) are well known in the art, and are often used in teleconferencing for transmitting television image information from a transmitter to a receiver over a relatively narrow bandwidth transmission channel. FIGS. 2 and 2a show two prior-art embodiments of DPCM loops that are incorporated in such data-compression transmission systems.

Referring to FIG. 2, the DPCM loop at the transmitter is comprised of subtraction means 200, summation means 202 and N-bit frame delay means 204. An uncompressed original N-bit digitized video input signal is applied to the plus input of subtraction means 200 and a feedback signal is applied to the minus input of subtraction means 200. Subtraction means 200, summation means 202 and N-bit frame delay means 204 operate as a first loop for deriving a delayed-sample signal that is applied to the minus input of subtraction means 200 and also to one of two plus inputs of summation means 202. More specifically, the error-signal output from subtraction means 200 is applied as the other of the two plus inputs of summation means 202 and the output from summation means 202 is applied as an input to frame-delay means 204. The delayed-sample signal is obtained at the output of frame-delay means 204.

Since each pixel sample of the error-signal output has a level value from subtraction means 200 which is the difference in level values of the corresponding pixel samples of the input signal and the delayed-sample signal, while the level value of each pixel sample of the summation means 202 output is the sum of the level values of the corresponding pixel samples of the error-signal output and the same delayed-sample signal, summation means 202 derives at its output a synthesized video signal that corresponds to the original input signal to subtraction means 200. This synthesized video signal, after a delay of one frame period by frame-delay means 204, constitutes the delayed-sample signal applied as an input to both subtraction means 200 and summation means 202. Thus, the pixel samples of the delayed-sample signal during a current image frame correspond with those of the input signal during the preceding image frame. Therefore, all non-zero-level-value samples of the error-signal output from subtraction means 200 correspond only with changes in image content between the current image frame and the preceding image frame.

This error-signal output is an (N+1)-bit (e.g., 9-bit), rather than N-bit (e.g., 8-bit) digitized signal for the same reasons discussed above in connection with FIG. 1. In a data-compressed transmission system, the error-signal is transmitted to the receiver over a transmission channel which includes a data-compression encoder (e.g., run-length and/or Huffman encoder) at the transmitter end of the transmission channel and a corresponding data-compression decoder at the receiver end of the transmission channel.

The receiver is comprised of an inverse DPCM loop which includes summation means 206 and N-bit frame delay means 208. The (N+1)-bit error-signal recovered at the receiver end of transmission channel 205 is applied as a first plus input to summation means 206, and the N-bit output from delay means 208 is applied as a delayed-sample signal to a second plus input of summation means 206. The output from summation means 206, which constitutes the N-bit synthesized signal output from the receiver, is applied as an input signal to frame-delay means 208.

It is apparent that summation means 206 at the receiver performs the same function as does summation means 202 at the transmitter. Therefore, a synthesized signal is derived at the output from summation means 202 of the transmitter which corresponds with the N-bit synthesized signal at the output from summation means 206 of the receiver. Further, the respective delayed output signals from frame delay means 204 of the transmitter and of frame delay means 208 of the receiver correspond to the N-bit video-signal input to subtraction means 200 during the previous frame (i.e., constitute predicted—not actual—level values of the respective pixel samples of the current frame). Therefore, the non-zero pixel level values of the error-signal output from subtraction means 200 corresponds solely to changes in image content between the current frame and the previous frame of the video-signal input to subtraction means 200. This substantially reduces the average amount of information that needs to be transmitted, in real time, from the transmitter to the receiver over transmission channel 205, thereby reducing the required bandwidth (and, hence, the cost) of transmission channel 205.

In FIG. 2, as in FIG. 1, the dynamic range of the pixel level values of the transmitted error signal is twice that of either the original input signal or the derived synthesized signal. Thus, in the usual case, in which the digitized input video signal is an 8-bit signal, the error-signal is a 9-bit signal, which increases the required bandwidth (and, hence, cost) of transmission channel 205.

In order to further reduce the required bandwidth (and, hence, cost) of transmission channel 205, the arrangement shown in FIG. 2 may be modified in the manner shown in FIG. 2a. Specifically, the (N+1)-bit error-signal output from subtraction means 200 is applied as an input to (N+1)-bit quantizer with N-bit limited output means 210, and the output from means 210 is applied both as an input to the transmitter end of transmission channel 205 and as the error-signal input to summation means 202. In all other respects, the arrangement shown in FIG. 2a is identical to that shown in FIG. 2.

Quantization reduces gray-scale resolution of the pixel level values of the video error signal, while N-bit limiting reduces the dynamic range of the pixel level values of the error signal. The benefit of quantization and limiting is to considerably further reduce the bandwidth (and, hence, cost) of the transmission channel 205 required to transmit the error signal in real time. However, the quantization and limiting are irreversable processes which result in a degradation of the image quality of displayed images derived at the receiver from the synthesized video signal.

Figure 3:
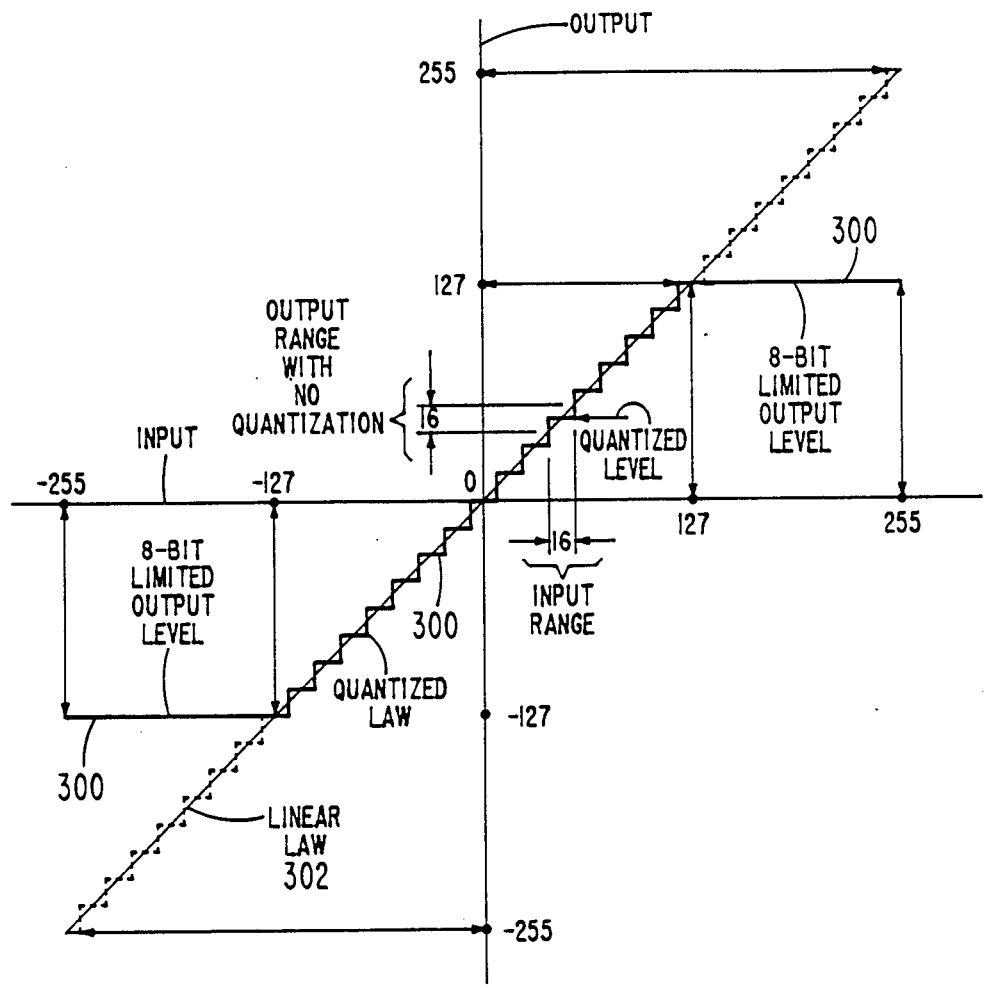
FIG. 3 illustrates the respective input-output relationships of a DPCM loop transmitter employing either a linear law or a quantized law with or without a limited output level.

FIG. 3 shows the relationship between the error-signal (1) as it is derived from subtraction means 200 and (2) as it is applied to the transmitter end of transmission channel 205 when quantizer means 210 is present (FIG. 2a) and when quantizer means 210 is absent or short-circuited (FIG. 2). As indicated in FIG. 3, the dynamic range of digitized pixel level values of a 9-bit error signal applied as an input to means 210 extends through all 511 numerical values from a minimum value of −255, through a value of zero, to a maximum value of +255. As indicated by a bold solid line in FIG. 3, the input-output characteristic 300 of means 210 follows a "quantized law" for the 255 input level values in the range between −127 and +127. In this severely-limited dynamic range, each group of 16 consecutive input level values is quantized to a single output level. Thus, there are only 17 different output level values within the range of input values between −127 and +127. It takes only eight bits to define each of these 17 different output level values with the same precision as each of the input level values because of the severely-limited dynamic range of input values over which the "quantized law" operates. For input level values that are more negative than −127 (i.e., −255 to −128) the output of characteristic 300 is severely limited to the single value −127 (which can be expressed as an 8-bit digital number with the same precision as an input level value −127). Similarly, for input level values above 127 (128 to 255), the output of characteristic 300 is severely limited to the single value +127 (which can also be expressed as an eight-bit digital number with the same precision as each input level value +127). Such severe limiting would be necessary in order to reduce dynamic range by one-half. However, such severe limiting would produce excessive image degradation. Therefore, in practice, less severe limiting that reduces dynamic range by less than one-half is employed.

It is apparent from FIG. 3 that the use of a "quantized law" transfer function inherently introduces error in the output with respect to the input. By making the quantization interval relatively small, the error can be maintained tolerable. However, for error-signal pixel input levels having large absolute values, limiting introduces significant distortion. Because error-signal level values sufficiently large to require limiting occur statistically at a relatively low rate (caused by fast movement of an object or change in scene from frame to frame to which the visual system of a viewer is relatively insensitive), such distortion can still be tolerated if the limiting is not too severe. In the past, it has been the price to be paid for a significantly further reduction in the amount of data per unit time that need be transmitted from transmitter to receiver over transmission channel 205 (thereby further reducing the bandwidth, and hence cost, of transmission channel 205).

If the N-bit limiting by means 210 were eliminated, the number of "quantized law" output levels (including those shown in phantom in FIG. 3) would increase to 33 from 17. While 33 quantized output levels is much smaller than the 511 different input levels, the 33 quantized output levels without limiting is still substantially double the 17 quantized output levels with limiting. However, without limiting, the excessive distortion in picture quality due to severely limiting (FIG. 3) the dynamic range by one-half (discussed above) is also eliminated.

In the absence of quantizer means 210 (the case in FIG. 2), a "linear law" transfer function 302, shown in FIG. 3, applies resulting in the complete elimination in quantization distortion. However, in this case it is necessary to transmit a 9-bit error signal, representing any of 511 different pixel level algebraic values, over transmission channel 205, thereby substantially increasing the required transmission channel bandwidth with respect that required by a quantized error signal.

Figure 4:
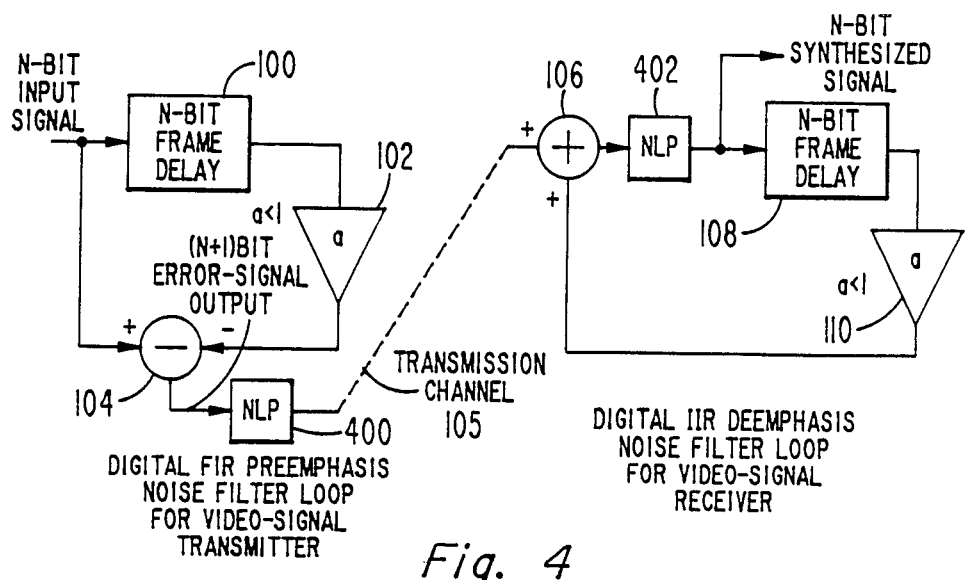
FIG. 4 illustrates a modification of the pre-emphasis and de-emphasis noise-reduction filter video-signal transmission system of FIG. 1 which incorporates the present invention.

Referring to FIG. 4, there is shown a modification of the pre-emphasis and de-emphasis noise filter transmission system of FIG. 1 which incorporates the present invention. More specifically non-linear processor (NLP) 400 is inserted between the output of subtraction means 104 and the transmitter end of transmission channel 105, and NLP 402 is inserted between the output of summation means 106 and the input to frame delay means 108. An example of the type of input-output characteristic exhibited by each of NLP 400 and 402 is shown in FIG. 6, discussed below.

Figure 5:
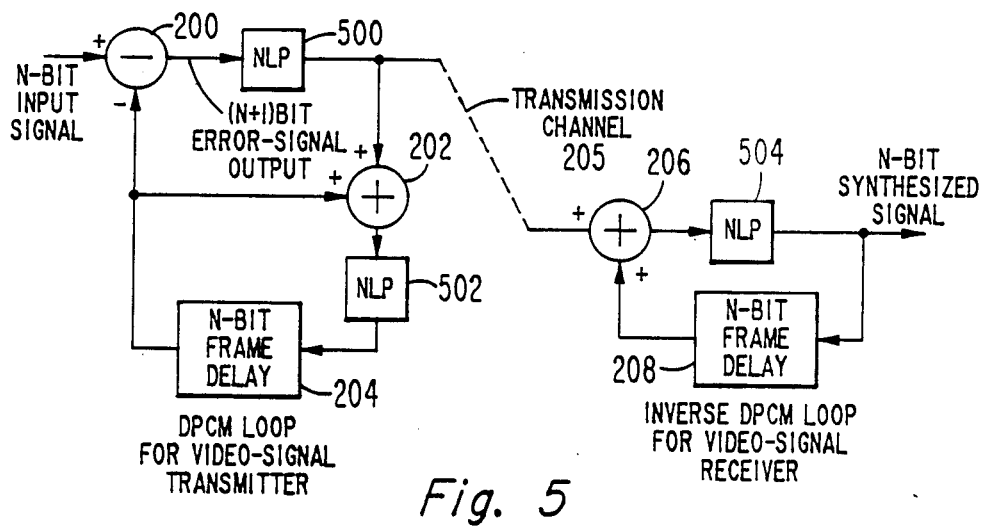
FIGS. 5 and 5a, respectively, illustrate modifications of the DPCM video-signal transmission systems of FIGS. 2 and 2a which incorporate the present invention.

Referring to FIG. 5, there is shown a modification of the DPCM transmission system of FIG. 2 incorporating the present invention. Specifically, FIG. 5 is similar to FIG. 2 except for the insertion of NLP 500 between the output of subtraction means 200 and both the input to summation means 202 and the transmitter end of transmission channel 205; the insertion of NLP 502 between the output of summation means 202 and the input to frame-delay means 204, and the insertion of NLP 504 between the output of summation means 206 and the input to frame delay means 208. Each of NLP 500, 502 and 504 also exhibits the type of input-output characteristic shown in FIG. 6, discussed below.

Figure 5A:
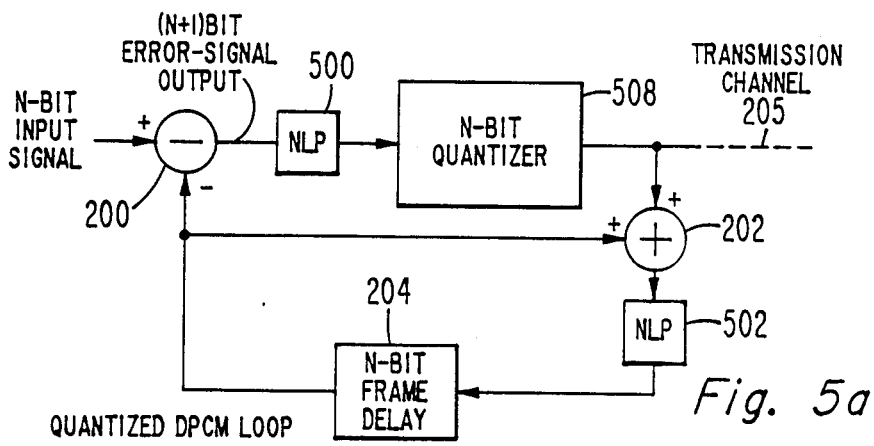

The quantized DPCM group of FIG. 5a differs from the DPCM loop of FIG. 5 by the insertion of N-bit quantizer 508 between the output of NLP 500 and the input to summation means 202 and the transmitter end of transmission channel 205. Therefore, the quantized DPCM loop of FIG. 5a differs from the quantized DPCM loop of FIG. 2a only by the insertion in FIG. 5a of NLP 500 and 502 by the substitution in FIG. 5a of N-bit quantizer 508 for (N+1)-bit quantizer with N-bit limited output 210 of FIG. 2a.

Figure 6:
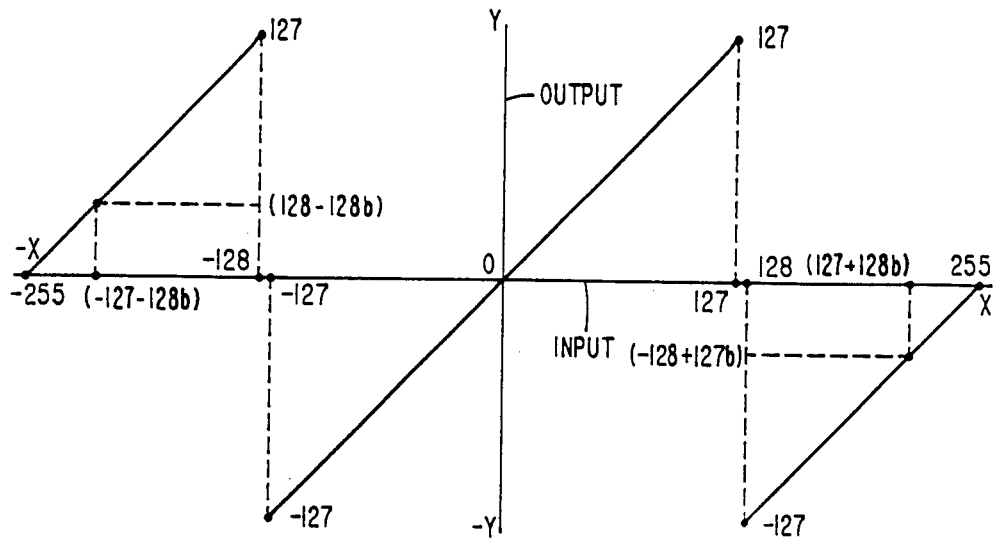

Referring to FIG. 6, it is assumed for illustrative purposes that the input signal in each of FIGS. 4, 5 and 5a is an 8-bit digitized video signal (i.e., N=8) representing a dynamic range of 256 different level values of the input signal ranging in binary notation from −128 to +127, which level values are substantially disposed about the middle of this dynamic range. In this case, the (N+1)-bit error-signal output from the subtraction means is a 9-bit digitized signal representing 511 different level values extending from −255 through 0 to +255.

As shown in FIG. 6, each of NLP 400, 402, 500, 502 and 504 exhibits a characteristic that converts an input signal having a dynamic range of 511 level values to an output having a dynamic range of only 255 level values. More specifically, for an input level value X, to any of the NLP of FIGS. 4, 5 or 5a that exhibits a negative value between −255 and −128 (i.e., for negative values of X that are more negative than minus M/2, where M in this case is the maximum numerical value 255), the output shown in FIG. 6 is equal to (255 +X). Note, again, that X has a negative value in this situation. For such an input level value X that exhibits a value of between −127 and +127 (i.e., is either less negative than −M/2 or less positive than plus M/2), the output level value is also X. For such an input level value X that exhibits a positive value of X between +128 and +255 (i.e., any positive value that is more positive than plus M/2), the output shown in FIG. 6 is (−255 +X).

In FIG. 4, the dynamic range of the input level value X (the input to NLP400) depends upon the value of a. Specifically, as shown in FIG. 6, the dynamic range of the input X extends from a negative value of (−127 −128b) to (127+128b), where 127+128b=255a. Since the value of a is always less than unity, the dynamic range of the input X of FIG. 4 is smaller than the maximum dynamic range from −255 to +255, shown in FIG. 6. However, in the case of FIGS. 5 and 5a, the dynamic range of the input X extends all the way from −255 to +255.

An NLP which exhibits the input-output characteristic shown in FIG. 6 may be easily implemented in hardware by the simple expedient of forwarding from the input thereof to the output thereof only the lower eight significant bits of each 9-bit digitized sample applied as an input thereto.

It is plain from FIG. 6 that the dynamic range of the output Y only extends between a maximum negative value of −127 and a maximum positive value of +127. Therefore, the dynamic range of the output level value Y is only one-half that of the input level value X. This permits the digitized error signal having only N bits (i.e., 8-bits) per sample, rather than (N+1)-bits (i.e., 9-bits) per sample, to be transmitted in real time from the transmitter to the receiver, thereby reducing the relatively costly bandwidth required of the transmission channel.

It would appear from the input-output characteristic shown in FIG. 6 that irreversible ambiguity errors would be introduced in the level values of the output level value Y from transmitter NLP 400 of FIG. 4 or transmitter NLP 500 of FIGS. 5 and 5a, which would prevent a synthesized signal derived at the receiver of FIG. 4, 5 or 5a from faithfully corresponding to the original input signal at the transmitter thereof. However, for the reasons discussed below, no irreversible error is introduced by the transfer function of NLP 400 or NLP 500.

During the very first frame of the N-bit (8-bit) input signal applied to the plus input of subtraction means 104 or 200, no previous frame exists. Therefore, any given artificial frame of pixel level-value samples can be stored in frame delay means 100 or 204, so long as exactly the same given artificial frame of pixel level-value samples is also stored in delay means 108 or 208. In practice, it is normal to select a frame comprised of all zero-level pixels as the given artificial frame.

Assuming the practical case, the pixel value of each of the pixel samples derived from the output of frame delay means 100 or 204 and applied to the minus input of subtraction means 104 or 200 is zero during this very first frame, the output from subtraction means 104 or 200 is an N-bit (8-bit) signal that is identical to the first-frame input signal. Thus, during this first frame, the dynamic range of the input level value X to the NLP 400 or 500 is limited to the range between −127 and +127, where the output is equal to the input and NLP 400 or 500 has no effect.

Further, during the very first frame, all of the frame-delayed pixel samples applied respectively as an input to summation means 106, 202 or 206 of FIGS. 4, 5 or 5a, also exhibit zero level values in the practical case. Thus, the output from each of summation means 106, 202 and 206 is identical to the signal input thereto. In the case of FIGS. 4 and 5 the signal input to summation means 106, 202 and 206 is the 8-bit error-signal output from NLP 400 or 500, without any quantization. In the case of FIG. 5a, the signal input to summation means 202 and 206 is the 8-bit error-signal output ftom NLP 500, after quantization by 8-bit quantizer 508. Thus, in all cases, during the very first frame, the output from each of summation means 106, 202 and 206 is always an 8-bit signal.

The 8-bit output signal from summation means 106, 202 or 206 during the very first frame is applied as an input to NLP 402, 502 or 504. For the reasons discussed above in connection with NLP 400 and 500, the corresponding input and output level values of the samples applied to NLP 402, 502 and 504 during the very first frame are equal to each other, so that the synthesized signal output therefrom will always be an N-bit signal. This N-bit output signal from NLP 402, 502 or 504, in the very first frame, is also applied as an input to N-bit frame-delay means 108, 204 or 208 to derive the frame-delayed 8-bit feedback-signal input to summation means 106, 202 or 206 during the second frame, which corresponds to the N-bit synthesized signal derived during the first frame. In the case of FIGS. 4 and 5, the frame-delayed sample input to summation means 106, 202 or 206 during any frame corresponds substantially exactly to the frame-delayed sample-input to subtraction means 104 or 204. Except for irreversible quantization errors, this relationship holds for FIG. 5a as well.

Because of changes in image content between the first and second frames, the error signal output from subtraction means 104 or 200 during the second frame may include one or more pixel level values having either negative or positive polarity and an absolute value between +128 and +255. In the case of error-signal pixels having negative level values between −128 and −255, the effect of NLP 400 or 500 is to add 255 to such negative values, while in the case of error-signal pixels having positive level values between +128 and +255, the effect of NLP 400 or 500 is to subtract 255 from such positive level values. This results in the output level values between zero and +127 and between −127 and zero shown in FIG. 6. Thus, as indicated in FIG. 6, the polarity of the output level values is reversed with respect to both negative and positive input level values for all input pixel level values to NLP 400 or 500 having absolute values between 128 and 255.

The effect of the input-output characteristic of NLP 400 or 500 is reflected in the respective level values derived from the output of summation means 106, 202 or 206. Specifically, for negative pixel level values between −255 and −128 applied to the input of NLP 400 or 500, the output from summation means 106, 202 or 206 is equal to the sum of the correct level value for the corresponding pixel of the synthesized signal and +255 (the later having been introduced by the input-output characteristic of NLP 400 or 500). However, in the case of positive input level values to NLP 400 or 500 between +128 and +255, the output from summation means 106, 202 or 206 is equal to the difference of the correct pixel level value or the synthesized signal and −255 (again due to the input-output characteristic of NLP 400 or 500). In order to obtain the correct pixel level value of the synthesized signal, it is necessary, in the first case, to subtract 255 from the output of summation means 106, 202 or 206, and, in the second case, to add 255 to the output from summation means 106, 202, or 206. NLP 402, 502 and 504 in FIGS. 4 and 5 (which also exhibit the input-output characteristic shown in FIG. 6) inherently perform this function, thereby deriving, as an output therefrom N-bit synthesized-signal pixels having level values that correctly correspond to the level value of the N-bit input-signal pixels during that image frame.

It is clear that for input level values between −127 and +127, where the corresponding input and output level values of all of NLP 400, 500, 402, 202, 500, 502 and 504 of FIGS. 4 and 5 are equal to each other, each of these NLP is without effect. Therefore, for all possible level values between −255 and +255 of the (N+1)-bit error-signal from subtraction means 104 or 200, the level values of the N-bit synthesized-signal pixels always will faithfully conform to the corresponding level values of the N-bit input-signal pixels during the second frame.

All that has been said above with respect to the second frame, applies with equal force to each successive frame beyond the second frame. Further, from the above discussion it is apparent that the operation of the present invention does not depend on the same given artificial previous frame of pixel sample level values stored in the delay means of both the first and second loops during the first frame being zero level values, as assumed in the above discussion.

Figure 7:
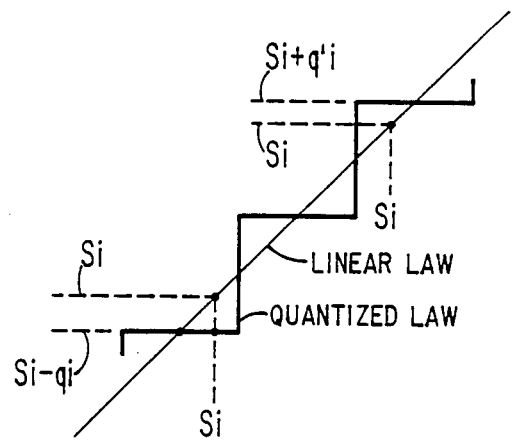

In FIG. 5a, the insertion of N-bit quantizer 508 between the output of NLP 500 and both the input to summation means 202 and the transmitter end of transmission channel 205 introduces irreversible information loss that degrades the synthesized-signal image content at the receiver with respect to that of the original input-signal image content at the transmitter. Specifically, as shown in FIG. 7, the use of a "quantized law" rather than a "linear law" means that an input pexel level value $S_i$ results in a corresponding synthesized-signal pixel level value of either $s_i+q_i$ or $S_i-q_i$ (where $q_i$ is an irreversible error due to quantizing that has a value between zero and a maximum value. This maximum value is equal to one-half the rise in a "quantized-law" step for all steps except the top and bottom step. For each of the top and bottom steps, the "quantized law" error may be as the entire rise of the step. The only effect of this irreversible "quantized-law" error by the insertion of NLP 500 and 502 in the quantized DPCM loop of the transmitter shown in FIG. 5a, and by the insertion of NLP 504 in the inverse DPCM loop of the receiver which cooperates with the quantized DPCM loop of FIG. 5a, is to reduce the maximum dynamic range of the input-signal-sample level values by the relatively small value of the "quantized-law" error.

The benfit of the present invention with respect to FIG. 5a is that the rise in a "quantized-law" step can be reduced by one-half, with a significant reduction in quantization error, without increasing the number of quantization steps of the quantized error signal. Alternatively, the number of quantization steps can be reduced by one-half without any increase in quantization error.

We claim:

1. In a digital processing system for use in processing an input signal comprised of a temporal stream of successive digitized input samples occurring as a given sample frequency, the level value defined by each of said input samples being represented by a multibit code comprised of N bits, where N is a given plural number capable of defining a maximum numerical value M, and wherein at least a predetermined subset of said input samples defines successive level values of a specified parameter that recurs at each of successive time intervals equal to a first interval number of periods of said given sample frequency; said system being comprised of first and second loops eaoh of which includes delay means for delaying samples that are applied to said delay means by a second integral number of said time intervals, said first loop further including first processing means coupled to said delay means thereof and including subtraction means for deriving from said input signal an output signal comprised of samples each of which defines a level value that corresponds to the difference between the respective level values of the current sample of said specified parameter and a first given function of at least one previous sample of said specified parameter, and said second loop further including second processing means coupled to said delay means thereof and to said first loop and including summation means for deriving from said output signal of said first loop a synthesized signal comprised of samples each of which defines a level value that corresponds to the sum of the respective level values of the current sample of said first-loop output signal and a second given function of at least one previous sample of said first-loop output signal, said second given function being substantially the inverse function of said first given function; and wherein said subtraction means derives an error signal comprised of samples each of which defines a level value equal to the difference between the N-bit level values of said N-bit current sample of said specified parameter and the corresponding N-bit delayed sample of said specified parameter whereby a multibit oode of (N+1)-bits one bit of which represents polarity and N bits of which represent absolute value, is required to represent the algebraic level value of each of said error-signal samples, and said summation means derives a sum signal comprised of samples each of which defines a level value equal to the sum of the level value of the current sample of the output signal of said first loop and the corresponding delayed sample of the output signal of said first loop; the improvement wherein:

each of said first and second processing means of said respective first and second loops further comprises non-linear processor (NLP) means exhibiting a given non-linear characteristic for modifying the level value X of sample-inputs thereto, said given non-linear characteristic being such that for sample-inputs thereto having (1) negative values of X that are more negative than minus M/2, the output is equal to (M+X), (2) negative values of X that are less negative than minus M/2, the output is equal to X, (3) positive values of X that are less positive than plus M/2, the output is equal to X, and (4) positive values of X that are more positive than plus M/2, the output is equal to (−M+X), said error-signal samples being applied as said sample-inputs to said NLP of said first processing means, and said sum-signal samples being applied as said sample-inputs to said NLP of said second processing means;

said first processing means further comprises first derivation means coupled to said delay means of said first loop for deriving said corresponding delayed samples of said specified parameter, after a delay equal to said second interval number of time intervals, from solely one of (a) said input samples of said input signal and (b) said modified error-signal samples; and said second processing means further comprises second derivation means coupled to said delay means of said second feedback loop for deriving said corresponding delayed samples of said output signal of said first loop, after a delay equal to said second interval number of time intervals, from said modified sum-signal samples.

2. The digital processing system defined in claim 1, wherein:

said input signal is a television video signal comprised of digitized pixel samples defining each of successive scanned two-dimensional image frames, wherein each of said successive time intervals as equal to an image-frame period of said television video signal, and a subset of pixel samples corresponding to each individual one of the separate spatially-located pixel of an image frame defines the level values of a different specified parameter that recurs every image-frame period.

3. The digital processing system, defined in claim 2, wherein;

said second integral number is one, whereby each of said delay means of said first and second loops delays each pixel sample applied thereto for a single frame period.

4. The digital processing system defined in claim 2, wherein:

N is equal to eight and defines a maximum numerical value M equal to 255.

5. The digital processing system defined in claim 2, wherein:

said first derivation means derives said corresponding delayed samples of said specified parameter from solely said input samples of said input signal;

each of said first and second derivation means includes means for multiplying the level value of each of the respective output samples from said delay means thereof by a given fractional factor less than unity to derive said respective corresponding delayed samples thereof from said multiplied samples;

each modified error-signal sample constitutes an output-signal sample of said first loop; and said first loop operates as a finite-impulse-response pre-emphasis filter and said second loop operates as an infinite-impulse-response de-emphasis filter.

6. The digital processing system defined in claim 2, wherein:

said first derivation means derives said corresponding delayed samples specified parameter from said modified error-signal samples, and includes second summation means for adding the level value of each of said modified error-signal samples directly to the level value of the corresponding delayed sample of said first specified parameter applied to said subtraction means of said first loop to derive second sum-signal samples, a second NLP exhibiting the same input-output characteristic as the first-mentioned NLP of said first loop for modifying the level value of each of said second sum-signal samples, said modified second sum-signal samples being applied as an input to said delay means of said first loop, and said corresponding delayed samples of said specified parameter being derived at the output of said delay means of said first loop;

each modified error-signal sample constitutes an output-signal sample of said first loop; and said first loop operates as a linear-law differential-pulse-code modulator (DPCM), for said input-signal samples, and said second loop operates as an inverse DPCM for said output-signal samples from said first loop.

7. The digital processing system defined in claim 2, wherein:

said first means derives said corresponding delayed samples of said specified parameter from said modified error-signal samples, and includes a quantizer for quantizing the level value of said modified error-signal samples in accordance with a given quantization law, second summation means for adding the level value of each of said quantized modified error-signal sampled to the level value of the corresponding delayed sample of said specified parameter applied to said subtraction means of said first loop to derive second sum-signal samples, a second NLP exhibiting the same input-output characteristic as the first-mentioned NLP of said first loop for modifying the level value of each of said second sum-signal samples, said modified second sum-signal sampes being appied as an input to said delay means of said first loop, and said corresponding delayed samples of said specified parameter being derived at the output of said delay means of said first loop;

each quantized modified error-signal sample constitutes an output-signal sample of said first loop; and said first loop operates as a quantized-law differential pulse-code modulator (DPCM) for said input-signal samples, and said second loop operates as an inverse DPCM for said output-signal samples from said first loop.

8. A digital processing system includes first loop for use in transmitting an output signal therefrom to a second loop, said first loop processing an input signal comprised of a temporal stream of successive digitized input samples occurring at a given sample frequency, the level value defined by each of said input samples being represented by a multibit code comprised of N bits, where N is a given plural number capable of defining a maximum numerical value M, and wherein at least a predetermined subset of said input samples defines successive level values of a specified parameter that recurs at each of successive time intervals equal to a first interval number of periods of said given sample frequency; said first loop including delay means for delaying samples that are applied to said delay means by a second integral number of said time intervals, processing means coupled to said delay means and including subtraction means for deriving said output signal of said first loop from said input signal thereto, said output signal of said first being comprised of samples each of which defines a level value that corresponds to the difference between the respective level values of the current sample of said specified parameter and a first given function of at least one previous sample of said specified parameter, and said second loop deriving from said output signal of said first loop a synthesized signal comprised of samples having respective level values that correspond to the respective level values of said input-signal samples to said first loop, and wherein said subtraction means of said first loop derives an error signal comprised of samples each of which defines a level value equal to the difference between the N-bit level values of said N-bit current sample of said specified parameter and the corresponding N-bit delayed sample of said specified parameter, whereby a multibit code of (N+1)-bits, one bit of which represents polarity and N bits of which represent absolute value, is required to represent the algebraic level value of each of said error-signal samples the improvement wherein said processing means further comprises:

non-linear processor (NLP) means exhibiting a given non-linear characteristic for modifying the level value of sample-inputs thereto, said given non-linear characteristic being such that for sample-inputs thereto having (1) negative values of X that are more negative than M/2, the output is equal to (M+X), (2) negative values of X that are less negative than minus M/2, the output is equal to X, (3) postive values of X that are less positive than plus M/2, the output is equal to X, and (4) positive values of X that are more positive than plus M/2, the output is equal to (−M+X), said error-signal samples being applied as said sample-inputs to said NLP; and derivation means coupled to said delay means for deriving said corresponding delayed samples of said specified parameters after a delay equal to said second integral number of time intervals, from solely one of (a) said input samples of said input signal and (b) said modified error-signal samples.

9. The digital processing system defined in claim 8, wherein:

said input signal is a television video signal comprised of digitized pixel samples defining each of successive scanned two-dimensional image frames, wherein each of said successive time intervals is equal to an image-frame period of said television video signal, and a subset of pixel samples corresponding to each individual one of the separate spatially-located pixel of an image frame defines the level values of a different specified parameter that recurs every image-frame period.

10. The digital processing system, defined in claim 9, wherein;

said second integral number is one, whereby each of said delay means of said first loop delays each pixel sample applied thereto for a single frame period.

11. The digital processing system defined in claim 9, wherein:

N is equal to eight and defines a maximum numerical value M equal to 255.

12. The digital processing system defined in claim 9, wherein:

said derivation means derives said corresponding delayed samples of said specified parameter from solely said input samples of said input signal; and includes means for multiplying the level value of each of the respective output samples from said delay means thereof by a given fractional factor less than unity to derive said corresponding delayed samples of said specified parameter from said multiplied samples;

eaoh modified error-signal sample constitutes an output-signal sample of said first loop; and said first loop operates as a finite-impulse-response pre-emphasis filter.

13. The digital processing system defined in claim 9, wherein:

said derivation means derives said corresponding delayed samples of said specified parameter from said modified error-signal samples, and includes summation means for adding the level value of each of said modified error-signal samples directly to the level value of the corresponding delayed sample of said specified parameter applied to said subtraction means to derive sum-signal samples, a second NLP exhibiting the same input-output characteristic as the first-mentioned NLP for modifying the level value of each of said sum-signal samples, said modified sum-signal samples being applied as an input to said delay means, and said corresponding delayed samples of said specified parameter being derived at the output of said delay means;

each modified error-signal sample constitutes an output-signal sample of said first loop; and said first loop operates as a linear-law differential-pulse-code modulator (DPCM), for said input-signal samples.

14. The digital processing system defined in claim 9, wherein:

said derivation means derives said corresponding delayed samples of said specified parameter from said modified error-signal samples, and includes a quantizer for quantizing the level value of said modified error-signal samples in accordance with a given quantization law, summation means for adding the level value of each of said quantized modified error-signal samples to the level value of the corresponding delayed sample of said specified parameter applied to said subtraction means to derive sum-signal samples, a second NLP exhibiting the same input-output characteristic as the first-mentioned NLP for modifying the level value of each of said sum-signal samples, said modified sum-signal samples being applied as an input to said delay means, and said corresponding delayed samples of said specified parameter being derived at the output of said delay means;

each quantized modified error-signal sample constitutes an output-signal sample of said first loop; and said first loop operates as a quantized-law differential pulse-code modulator (DPCM) for said input-signal samples.

15. A digital processing system includes second loop for use in receiving an output signal transmitted from a first loop, in which said first loop processes an input signal comprised of a temporal stream of successive digitized input samples occurring at a given sample frequency, the level value defined by each of said input samples being represented by a multibit code comprised of N bits, where N is a given plural number capable of defining a maximum numerical value M, and wherein at least a predetermined subset of said input samples defines successive level values of a specified parameter that recurs at each of successive time intervals equal to a first integral number of periods of said given sample frequency; said second loop including delay means for delaying samples that are applied to said delay means by a second integral number of said time intervals, said transmitted output signal being comprised of samples each of which defines a level value that corresponds to the difference between the respective level values of the current sample of said specified parameter and a first given function of at least one previous sample of said specified parameter, and said second loop further including processing means coupled to said delay means thereof and to said first loop and including summation means for deriving from said transmitted first-loop output signal a synthesized signal comprised of samples each of which defines a level value that corresponds to the sum of the respective level values of the current sample of said transmitted first-loop output signal and a given function of at least one previous sample of said transmitted first-loop output signal; and wherein said summation means derives a sum signal comprised of samples each of which defines a level value equal to the sum of the level value of each sample of the transmitted output signal from said first loop and a corresponding delayed sample of said transmitted first-loop output signal; the improvement wherein said processing means further comprises:

non-linear processor (NLP) means exhibiting a given non-linear characteristic for modifying the level value of sample-inputs thereto, said given non-linear characteristic being such that for sample-inputs thereto having (1) negative values of X that are more negative than minus M/2, the output is equal to (M+X), (2) negative values of X that are less negative than minus M/2, the output is equal to X, (3) positive values of X that are less positive than plus M/2, the output is equal to X, and (4) positive values of X that are more positive than plus M/2, the output is equal to (−M+X); and derivation means coupled to said delay means for deriving said corresponding delayed samples of said transmitted first-loop output signal, after a delay equal to said second integral number of time intervals, from said modified sum-signal samples.

16. The digital processing system defined in claim 15, wherein:

said input signal is a television video signal comprised of digitized pixel samples defining each of successive scanned two-dimensional image wherein each of said successive time intervals is equal to an image-frame period of said television video signal, and a subset of pixels samples corresponding to each individual one of the separate spatially-located pixel of an image frame defines the level values of a different specified parameter that recurs every image-frame period.

17. The digital processing system, defined in claim 15, wherein;

said second integral number is one, whereby said delay means of said second feedback loop delays each pixel sample applied thereto for a single frame period.

18. The digital processing system defined in claim 15, wherein:

N is equal to eight and defines a maximum numerical value M equal to 255.

19. The digital processing system defined in claim 15, wherein:

said derivation means includes means for multiplying the level value of each of the respective output samples from said delay means thereof by a given fractional factor less than unity to derive said corresponding delayed samples of said transmitted first-loop output signal from said multiplied samples; and said second loop operates as an infinite-impulse-response de-emphasis filter.

20. The digital processing system defined in claim 15, wherein said second loop operates as an inverse Differential Pulse Code Modulator (DPCM) for said transmitted output-signal samples from said first loop.

* * * * *

UNITED STATES PATENT AND TRADEMARK OFFICE
CERTIFICATE OF CORRECTION

PATENT NO. : 4,684,983

DATED : August 4, 1987

INVENTOR(S): Alfonse Acampora; Chung H. Lu

It is certified that error appears in the above-identified patent and that said Letters Patent is hereby corrected as shown below:

Col. 1, line 52, change "zignal" to --signal--.

Col. 2, line 12, change "an" to --and--.

Col. 4, line 57, change "a" to --$\underline{a}$--.

Col. 4, line 66, change "a" to --$\underline{a}$--. (2nd occurrence)

Col. 5, line 42, change "a" to --$\underline{a}$--.

Col. 5, line 43, change "a" to --$\underline{a}$--.

Col. 9, line 42, change "a" to --$\underline{a}$--.

Col. 9, line 46, change "a" to --$\underline{a}$--.

Col. 11, line 30, change "or" to --for--.

Col. 12, line 21, change "benfit" to --benefit--.

Col. 12, line 32, change "as" to --at--.

Col. 12, line 40, change "interval" to --integral--.

Col. 12, line 42, change "eaoh" to --each--.

Col. 13, line 2, change "oode" to --code--.

Col. 13, line 36, change "interval" to --integral--.

UNITED STATES PATENT AND TRADEMARK OFFICE
CERTIFICATE OF CORRECTION

PATENT NO. : 4,684,983

DATED : August 4, 1987

INVENTOR(S) : Alfonse Acampora; Chung H. Lu

It is certified that error appears in the above-identified patent and that said Letters Patent is hereby corrected as shown below:

Col. 13, line 45, change "interval" to --integral--.

Col. 14, line 62, change "sampes" to --samples--.

Col. 14, line 62, change "appied to --applied--.

Col. 15, line 18, change "val" to --gral--.

Col. 15, line 63, change "parameters" to --parameter--.

Signed and Sealed this

Fifteenth Day of December, 1987

Attest:

DONALD J. QUIGG

*Attesting Officer*     *Commissioner of Patents and Trademarks*